United States Patent
Tilson, Jr.

(10) Patent No.: US 7,777,628 B2
(45) Date of Patent: Aug. 17, 2010

(54) RADIO FREQUENCY IDENTIFICATION SYSTEM AND METHOD FOR USE IN CAST CONCRETE COMPONENTS

(76) Inventor: Thomas M. Tilson, Jr., 6 Liberty La., Lynnfield, MA (US) 01940

( * ) Notice: Subject to any disclaimer, the term of this patent is extended or adjusted under 35 U.S.C. 154(b) by 369 days.

(21) Appl. No.: 11/855,766

(22) Filed: Sep. 14, 2007

(65) Prior Publication Data

US 2009/0072978 A1    Mar. 19, 2009

(51) Int. Cl.
G08B 13/14    (2006.01)
(52) U.S. Cl. .................. 340/572.1; 340/572.8; 235/375
(58) Field of Classification Search ............. 340/572.1, 340/572.9, 572.4, 572.7, 572.8, 539.1, 539.13; 249/205; 264/238, 232, 239; 235/375, 385, 235/435, 436, 438, 449; 52/20, 21
See application file for complete search history.

(56) References Cited

U.S. PATENT DOCUMENTS

| 6,865,515 | B2 | 3/2005 | Fox et al. | |
| 2007/0126155 | A1* | 6/2007 | Korwin-Edson et al. | .... 264/333 |

FOREIGN PATENT DOCUMENTS

| DE | 4437808 A1 | 4/1996 |
| DE | 19603684 A1 | 8/1997 |
| JP | 2006309410 A * | 11/2006 |
| WO | WO-01/31504 A1 | 5/2001 |
| WO | WO-04/000679 A1 | 12/2003 |
| WO | WO-2005/112685 A1 | 12/2005 |
| WO | WO-2006/051295 A1 | 5/2006 |
| WO | WO 2006051295 A1 * | 5/2006 |

OTHER PUBLICATIONS

"Notification of Transmittal of the International Search Report and the Written Opinion of the International Searching Authority, or the Declaration," International Filing Date: Sep. 11, 2008, International Application No. PCT/US2008/010612, Applicant: International Coding Technologies, Date of Mailing: Jan. 13, 2009, pp. 1-14.
Akinci, Burcu et al., "Utilizing Radio Frequency Identification on Precast Concrete Components—Supplier's Perspective," International Symposium on Automation and Robotics in Construction, Sep. 2002, pp. 1-6.

(Continued)

Primary Examiner—Toan N Pham
(74) Attorney, Agent, or Firm—Cesari and McKenna, LLP; Michael R. Reinemann (57) ABSTRACT

A radio frequency identification (RFID) assembly is configured for use with cast concrete components. The RFID assembly has a planar back plate having a plurality of breakaway, registration posts extending perpendicular to the nominal plane of the back plate, and a plurality of gripping surfaces extending opposite the registration posts. The RFID assembly further includes a RFID transponder encapsulated between the back plate and a cover. The RFID transponder is programmed with information concerning the cast concrete component to which the RFID tag is affixed.

16 Claims, 8 Drawing Sheets

OTHER PUBLICATIONS

Hansen, Will, Ph.D. and Sunny Surlaker, "Embedded Wireless Temperature Monitoring System For Concrete Quality Control," University of Michigan, Jun. 2006, pp. 1-43.

"Concrete Accessories: Various Accessories for all your Concrete Needs: Polylok Inspection Tags," Polylok Inc., pp. 1-3, <http://www.polylok.com/products_details.asp?Product_ID=46>.

"Cyber-Concrete Lets Walls Speak," Pink Tentacle, Dec. 15, 2006, pp. 1-5, <http://www.pinktentacle.com/2006/12/cyber-concrete-lets-walls-speak/>.

"Concrete Maturity Monitoring System (CMMS): The HardTrack Concrete Maturity Monitoring System," Wake, Inc., pp. 1-6, <http://www.web.archive.org/web/20060511020820/www.wakeinc.com/page...>.

* cited by examiner

RADIO FREQUENCY IDENTIFICATION SYSTEM AND METHOD FOR USE IN CAST CONCRETE COMPONENTS

BACKGROUND OF THE INVENTION

1. Field of the Invention

The present invention relates to systems and methods for applying identification information to components and, more specifically, to a radio frequency identification system and method for use with cast concrete components.

2. Background Information

Concrete elements or components, such as castings, are often used in the construction of civil engineering projects, such as water supply systems, wastewater systems, storm water systems and drainage systems. For example, a wastewater system typically includes a series of concrete manhole risers interconnected by concrete pipes. These elements are typically precast at a manufacturing facility, and then shipped to the location at which they are to be installed. The manhole risers and pipes are placed in ditches and connected in the desired manner. The ditches are then filled in, burying the manhole risers and pipes. Often, roads are then built over the manhole risers and pipes.

Once they are built, these civil engineering projects, such as the wastewater system, need to be periodically inspected and maintained. Having information regarding the individual concrete elements can often facilitate the construction, inspection, shipping, installation, maintenance, and upkeep of such projects. However, keeping accurate records has proven difficult. For example, keeping track of pre-pour and post-pour inspection data, concrete batch number, intended construction project, etc., in an efficient manner is not currently possible.

Accordingly, a need exists to improve the collection and maintenance of information concerning concrete elements used in civil engineering projects.

SUMMARY OF THE INVENTION

Briefly, the present invention relates to a radio frequency identification (RFID) assembly that is configured for use with cast concrete elements. In a preferred embodiment, the RFID assembly includes a planar back plate having a plurality of break-away, registration posts extending perpendicular to the nominal plane of the back plate, and a plurality of gripping or engagement flanges extending perpendicular to the nominal plane of the back plate opposite the registration posts. The RFID assembly further includes a RFID tag or transponder that is mounted on a receiving area of the back plate, and a cover that is affixed to the back plate, e.g., by bonding or welding, thereby sealing the RFID tag within the assembly. In addition to the RFID tag, a label carries human-readable, e.g., typewritten, information, about the component.

The RFID tag is programmed with information concerning the specific cast concrete element to which the RFID tag is affixed. The information stored on the RFID tag may be a serial number that is associated in a computer database with the name of the manufacturing facility that cast the concrete element, the date it was manufactured, the supplies used in its construction such as the concrete batch number and the type of reinforcing bar ("rebar") used, pre-pour and post-pour inspections results, etc. In the preferred embodiment, the RFID tag is a passive tag. That is, it does not include a power supply.

In use, a mold is assembled to create a desired concrete component. Rebar is preferably positioned within the mold to provide the required strength to the finished concrete component. An RFID assembly whose RFID tag stores a unique serial number is selected for the concrete component being fabricated. The RFID assembly maybe hung off one of the rebar sections pending a pre-pour inspection of the mold. An inspector preferably checks to see that the mold has been correctly set-up, and that the rebar has indeed been properly positioned within the mold. Once the mold and rebar have passed the pre-pour inspection, the RFID assembly is removed from the rebar section, and press-fit into the side of the mold. Specifically, the mold, which may be formed from wood or steel, is configured with a plurality of holes positioned to receive the registration posts of the RFID assembly. Concrete is then poured into the mold and cured. The gripping or engagement flanges that extend from the back plate of the RFID assembly engage the concrete and facilitate the creation of a permanent bond between the RFID assembly and the concrete component. The concrete component is then removed from the mold, and at least a portion of the registration posts may be broken away so that that RFID assembly is flush with the outside surface of the concrete component. A post-pour inspection of the concrete component also may be performed. Information regarding the construction of the concrete component including inspection results may be added to a db and associated with the unique serial number of the RFID assembly cast into the concrete component.

The concrete component may then be shipped to and installed at its intended destination. For example, the concrete component, which may be a manhole riser, is buried in the ground. Nonetheless, at any time thereafter, a maintenance or other worker can "read" the RFID tag contained within the RFID assembly climbing into the manhole riser, energizing the RFID tag and reading its data using a RFID reader. That is, the RFID assembly of the present invention preferably can be read through the solid wall of the concrete component, which includes both concrete and rebar.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
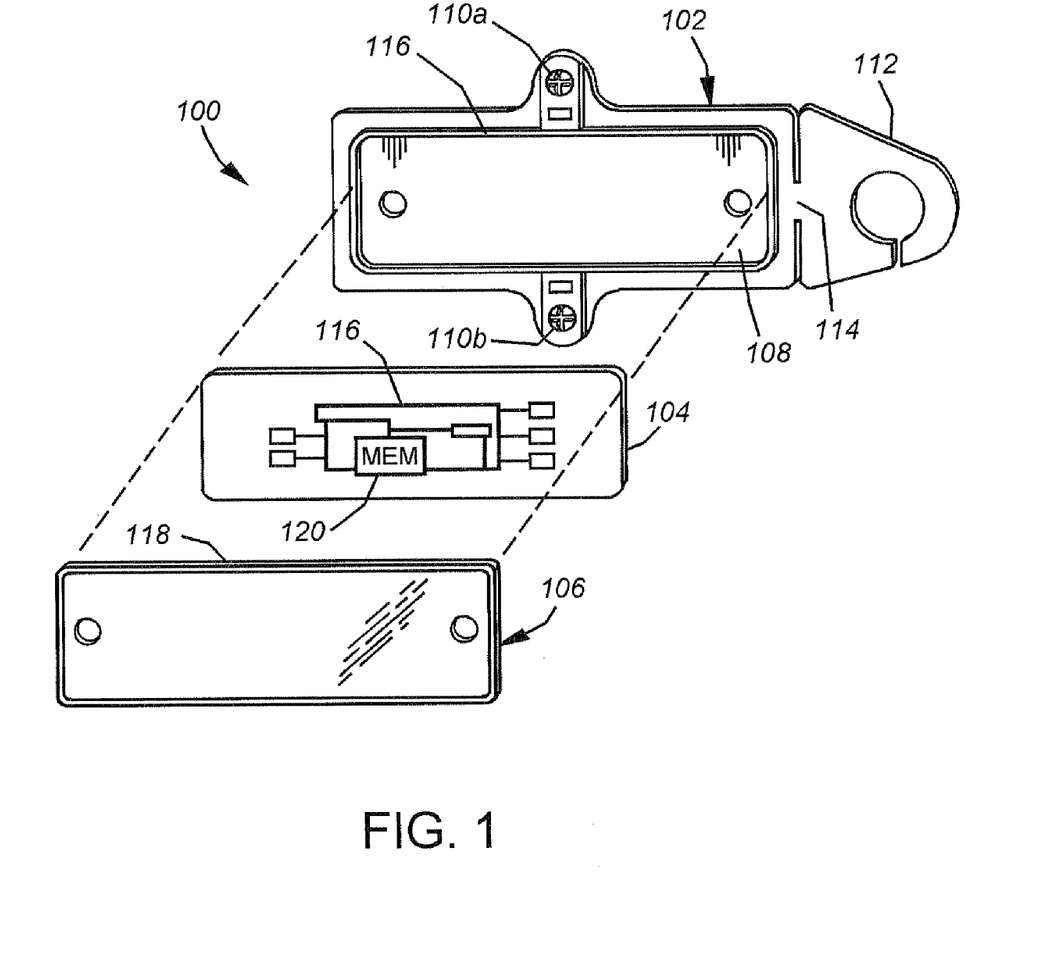
FIG. 1 is an exploded view of a preferred RFID assembly according to the present invention.

FIG. 1 is a highly schematic, exploded view of a radio frequency identification (RFID) assembly 100 according to a preferred embodiment of the present invention. The RFID assembly 100 includes a back plate 102, an RFID tag or transponder 104, and a cover 106. The back plate 102 has a substantially planar shape and includes a receiving area 108 sized and shaped to receive the RFID tag 104. In the embodiment of FIG. 1, the back plate 102 further includes a plurality of registration posts, such as registration posts 110a and 110b that extend substantially perpendicularly from the nominal plane of the back plate 102. The back plate 102 also may include a hook 112 located on one side of the back plate 102, such as side 114. As described in more detail below, the hook 112 is sized to fit over a section of reinforcing bar ("rebar") so that the RFID assembly 100 may be suspended from the rebar.

Those skilled in the art will understand that the RFID assembly 100 may be circular, oval, square, or some other shape.

A groove or recess 116 may be formed in the back plate 102 around the receiving area 108. The groove or recess 116 is preferably sized and shaped to match either the cover 106 itself, or a flange 118 extending around the perimeter of the cover 106 perpendicular to the nominal plane of the cover 106. The groove 116 and flange 118 cooperate to seat the cover 106 to the back plate 102.

To assemble the RFID assembly 100, the RFID tag 104 is preferably placed on the receiving area 108 of the back plate 102. The RFID tag 104 may be formed on a film, such as paper, having an adhesive backing. As described herein, human-readable, e.g., type written, information may also be placed on the paper film. The adhesive backing may be used to adhere the RFID tag 104 to the receiving area 108 of the back plate 102. The cover 106 is then placed over the RFID tag 104 so that the perimeter of the cover 106 (or the flange 118) sits in the groove or recess 116 formed in the back plate 102. The cover 106 and the back plate 102 are then joined together, e.g., by ultrasonic welding, bonding, heat sealing, etc. In the illustrative embodiment, the cover 106 and back plate 102 are joined so as to form a watertight seal around the RFID tag 104.

The back plate 102 and the cover 106 are preferably formed from polypropylene, and made by injection molding or other techniques.

In an alternative embodiment, the cover 106 is joined to the back plate 102 by a hinge. That is, a side edge of the cover 106 may be attached to a side edge of the back plate 102, such as the side edge opposite the hook 112. Once the RFID tag 104 has been placed on the back plate 102, the cover 106 may be swung around the hinge and sealed to the back plate 102. Those skilled in the art will understand that the hinge may be formed by molding a thin portion of material along the edge between the cover 106 and the back plate 102.

The RFID tag is preferably a passive type RFID tag. That is, it does not include its own power source. The RFID tag includes an antenna 116 coupled to a non-volatile memory 120, such as a read only memory (ROM), an erasable programmable ROM (EPROM), an electrically erasable programmable PROM (EEPROM), etc. A suitable RFID tag for use with present invention includes the Ultra High Frequency (UHF) Rafsec G2 DogBone model of RFID tag from UPM Raflatac, Inc., which can hold 96 or 128 bits of data.

Figure 2:
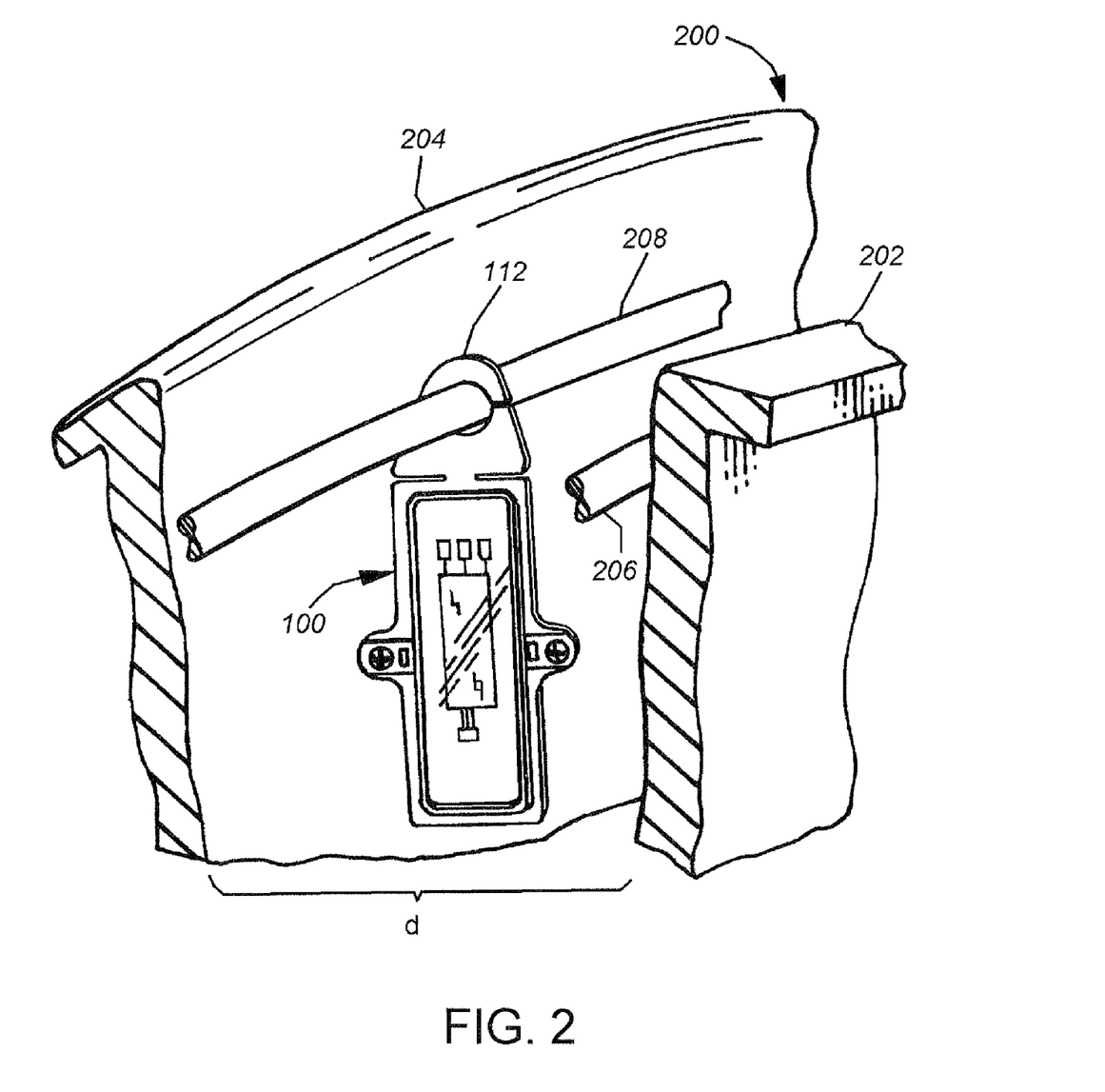
FIGS. 2 and 3 are illustrations of a portion of a concrete mold and the preferred RFID assembly of FIG. 1 in various positions during use.

FIG. 2 is a highly schematic illustration of the RFID assembly 100 placed in a temporary position within a mold 200 for use in casting a concrete component. More specifically, the mold 200, which is shown in a partial, cut-away view, has an inner jacket 202 and an outer jacket 204. The outer jacket 204 is spaced some distance, d, from the inner jacket 202 thereby defining a space to receive poured wet concrete. The two jackets may be substantially cylindrical in shape so that the resulting concrete component has a tubular or hollow cylindrical shape with an open interior. One or more reinforcement elements, such as reinforcing bar (rebar) segments 206 and 208, are placed within this space between the two jackets 202, 204. The reinforcement element, as is well-known in the art, is typically made of steel, and provides added strength to the concrete component being manufactured. Other types of reinforcement elements, besides rebar, include meshes, fences, fiberglass fibers, hoops, etc. The reinforcement element is placed within receiving space according to the design of the concrete component. Once the mold 200 has been set-up, and the rebar has been properly positioned inside the mole 200, the RFID assembly 100 may be hung from the reinforcement element, e.g., rebar segment 208, as shown in FIG. 2. That is, the hook 112 of the RFID assembly 100 is placed over the rebar segment 208.

After the reinforcement element(s) has been positioned within the mold 200 and before the concrete is added, an inspector preferably conducts a pre-pour inspection by, among other things, examining the mold 200 and the reinforcing element(s) to confirm that the mold has been correctly set-up, and that the reinforcing element(s) has been correctly positioned within the mold 200. If so, the inspector preferably removes the RFID assembly 100 from the reinforcing element, e.g., from rebar segment 208, and affixes it to the outer jacket 204 of the mold 200.

As described herein, the RFID assembly 100 stores a unique serial number that may be read by an RFID reader, entered into a computer database and associated with the particular concrete component being manufactured. Information concerning the construction or manufacture of the concrete component, such as the results of the pre-pour inspection, may be added to the database and associated with the unique serial number of the selected RFID assembly.

Figure 3:
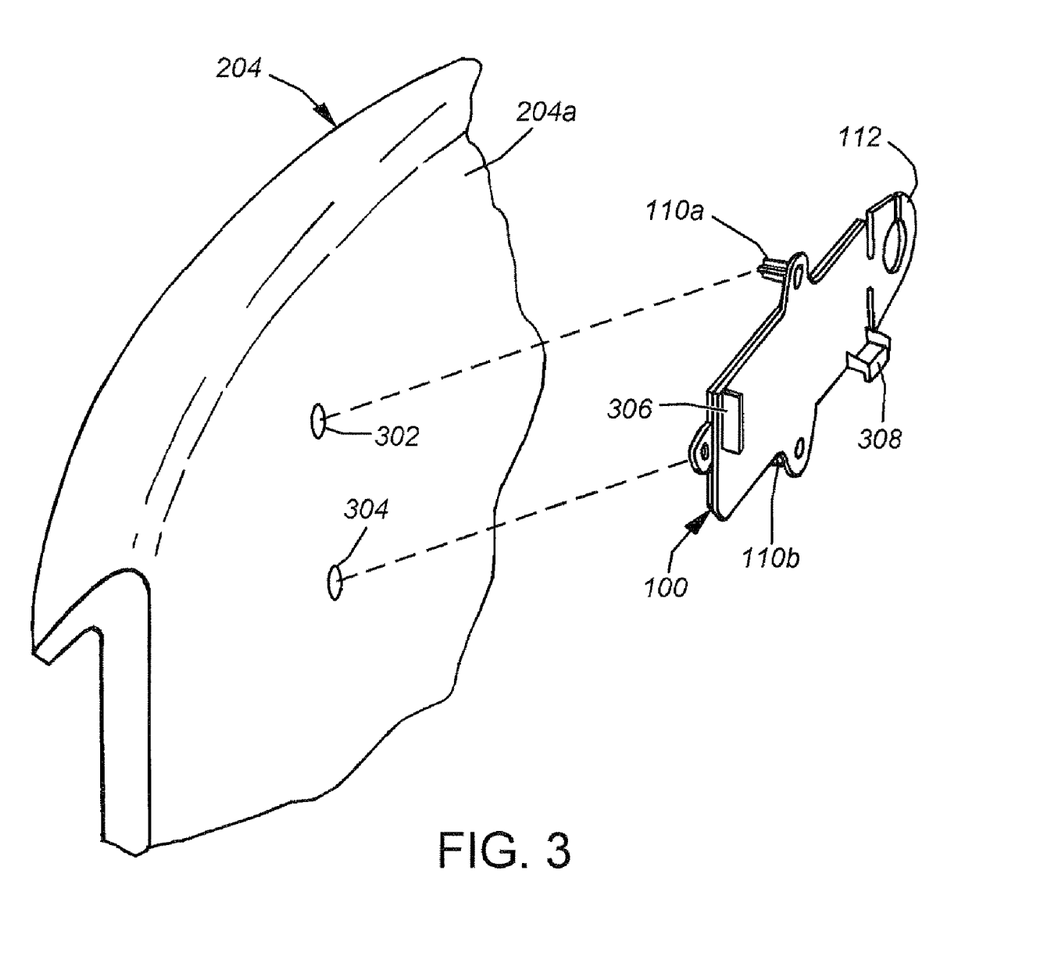

FIG. 3 is a highly schematic illustration of the RFID assembly 100 and the outer jacket 204 of the mold 200 (FIG. 2). The outer jacket 204 of the mold 200 has an inner face 204a that defines the outer surface of the concrete component being cast. Formed within the outer jacket 204 on the inner face 204a are two receiving holes 302 and 304. The two receiving holes 302 and 304 are sized and spaced to receive respective ones of the registration posts 110a, 110b of the RFID assembly 100, as illustrated by the dashed lines. Specifically, registration post 110a may be received in receiving hole 302, while registration post 110b may be received in receiving hole 304. In a preferred embodiment, one of the registration posts, e.g., post 110a, and its respective receiving hole, e.g., hole 302, is larger or of a different cross-sectional shape, such as square or oval as opposed to circular, so that the RFID assembly 100 can only be installed in one orientation. In this way, the RFID assembly 100 cannot mistakenly be installed upside down. As shown in FIG. 3, the RFID assembly 100 further includes one or more gripping or engagement flanges or surfaces, such as surfaces 306 and 308 that extend from the back plate 102 of the RFID assembly 100 in a direction substantially opposite to the registration posts 110a, 110b. The gripping or engagement surfaces 306, 308 help secure the RFID assembly 100 to the concrete to be added to the mold 200.

In the illustrated embodiment, the registration posts 110a, 110b of the RFID assembly 100 are press fit into the receiving holes 302, 304. The registration posts 110a, 110b may be tapered to facilitate their receipt within the receiving holes 302, 306. The RFID assembly 100 is preferably attached to the inner face 204a of the outer jacket 204 such that the cover 106 of the RFID assembly 100 is flush against the inner face 204a. Those skilled in the art will understand that barbs or other surface features may be added to the registration posts 110a, 110b to help hold the RFID assembly 100 against the outer jacket 204 as wet concrete is poured into the mold 200. Furthermore, the material(s) used to make the RFID assembly 100 is sufficiently elastic so that the cover 106 conforms to the shape of the inner face 204a of the outer jacket 204. Accordingly, when concrete is poured into the mold 200, no concrete is able to pass or settle between the cover 106 of the RFID assembly 100 and the inner face 204a of the outer jacket 204. Once the RFID assembly 100 has been press fit into the receiving holes 302, 304, concrete may be poured into the mold 200, and allowed to set to create the desired concrete component.

Those skilled in the art will understand that other arrangements of registrations posts and receiving holes may be used. For example, the RFID assembly 100 may include only one, or more than two, registration posts. In an alternative embodiment, rather than or in addition to having receiving holes, a mold 200 may be configured with a recess formed in the inner face 204a of the outer jacket 204. This recess, moreover, may be sized and shaped to receive the RFID assembly 100. That is, the depth of the recess may be something less than the thickness of the RFID assembly 100. In yet another embodiment, a receptacle may be attached to mold, e.g., at the inner face 204a, and the RFID assembly 100 may be seated in this receptacle before the wet concrete is added to the mold.

In yet another embodiment, the RFID assembly 100 may have one or more holes that extend through the back plate 102 in place of the registration posts. In this embodiment, the outer jacket 204 of the mold 200 similarly has one or more holes, e.g., holes 302 and 304, that line up with the holes in the RFID assembly 100. Before wet concrete is added to the mold 200, the RFID assembly 100 is held against the inner surface 204a of the outer jacket 204 by a worker so that the holes in the RFID assembly 100 line up with the holes 302, 304 in the outer jacket 204. A pin is then inserted through each pair of aligned holes, thereby keeping the RFID assembly 100 in place as wet concrete is added to the mold 200. Once the concrete has sufficiently hardened, the pins can be pulled out, and the concrete component can be removed from the mold 200. With this embodiment, the concrete component can be removed from the mold 200 even though it may not be fully cured.

Those skilled in the art will also understand that other designs or shapes of gripping or engagement surfaces may also be used, such as screw shapes, etc.

Once the wet concrete poured into the mold 200 has hardened, the mold 200 is removed or pulled apart to reveal the concrete component that was cast. At least some portion, such as the tips or outer portions, of the registration posts 110a, 110b may break away as the mold 200 is removed.

Figure 4:
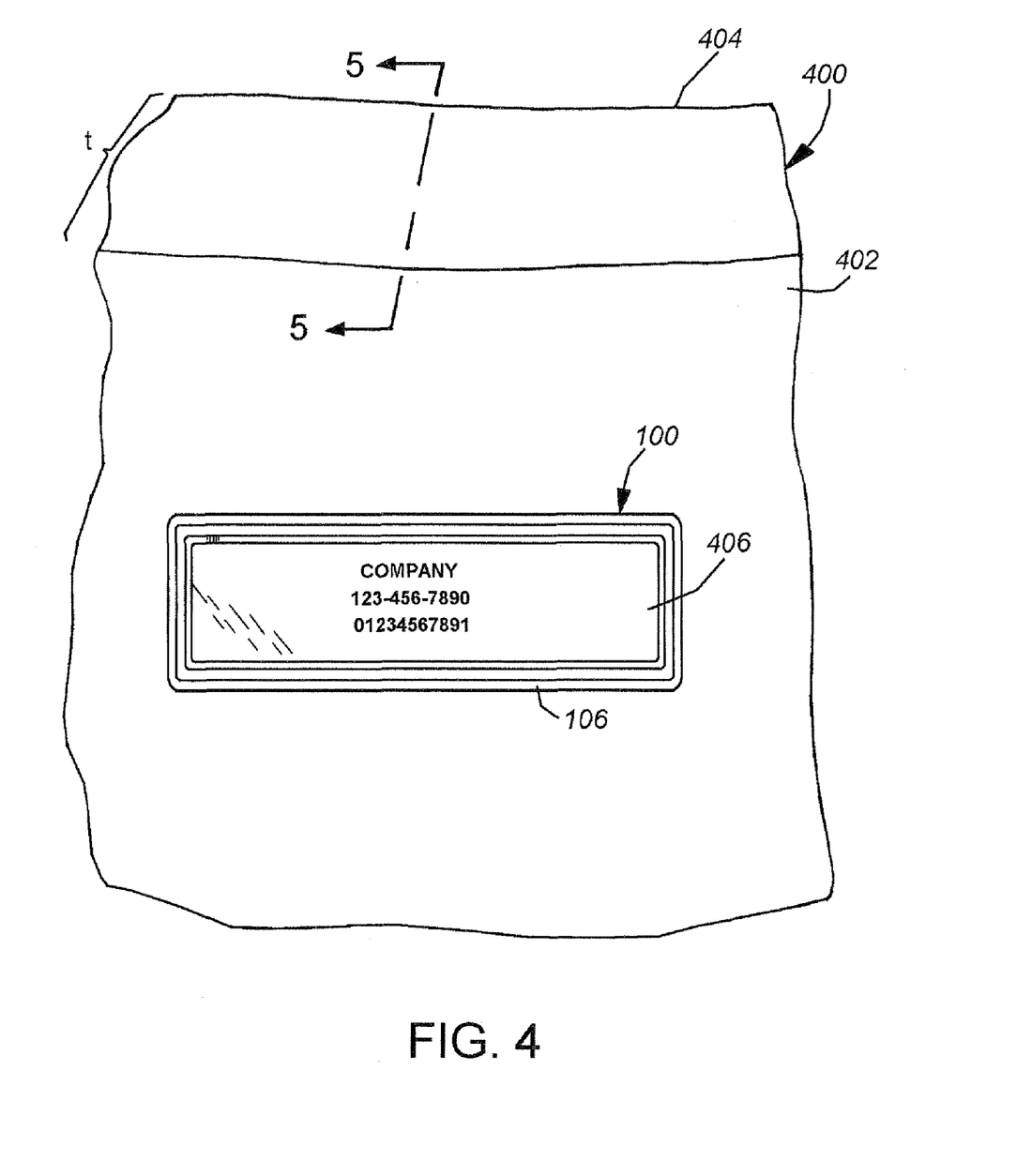
FIG. 4 is a partial side view of a precast concrete component with the RFID assembly of FIG. 1 installed.

FIG. 4 is a partial, highly schematic illustration of a concrete component 400 cast with the RFID assembly 100 in place. The concrete component 400, which may be a cylindrical manhole riser, has an outer surface 402 that corresponds to the inner face 204a (FIG. 3) of the outer jacket 204 of the mold 200, and an inner surface 404 that corresponds to an outer face (not shown) of the inner jacket 202 of the mold 200. The concrete component 400 further has a thickness, t, that corresponds to the spacing between the inner and outer jackets of the mold. Because the RFID assembly 100 was positioned flush against the inner face 204a of the outer jacket 204, it is visible on the outside surface of the concrete component 400. Nonetheless, the RFID assembly 100 is permanently adhered to the concrete component 400, at least in part due to the gripping surfaces 306, 308 (FIG. 3), which help hold the RFID assembly 100 in place in the concrete component 400.

As mentioned herein, the RFID assembly 100 further includes a label 402 placed behind the cover 106 that is transparent, so that the label 402 can be seen through the cover 106. Human-readable information, such as the name and telephone number of the company that cast the concrete component 400 is preferably printed on the label 406. The label 402 may be positioned between the cover 106 and the RFID tag 104 when the RFID assembly 100 is assembled so that the information may be read through the cover 106 of the RFID assembly 100. Alternatively, the RFID tag 104 itself may have a label printed on it.

Thus, the preferred RFID assembly 100 carries or bears information that is stored in two forms. First, the RFID assembly 100 includes electronic information, such as an identification number, stored on the RFID tag or transponder 104. This electronic information may be read by an RFID reader. Second, the RFID assembly 100 includes written or typed information, such as the name and telephone number of the manufacturer of the concrete component. This information, which may be located behind a transparent cover 106, is human readable, e.g., it may be perceived by simply reading it from the RFID assembly 100.

It should be understood that additional information may be printed on the label 406, such as the serial number 7 stored on the RFID tag or some other identification number assigned to or associated with the concrete component 400, the name and/or telephone number of the entity that manufactured the RFID assembly 100, a bar code bearing information about the concrete component, etc.

Figure 5:
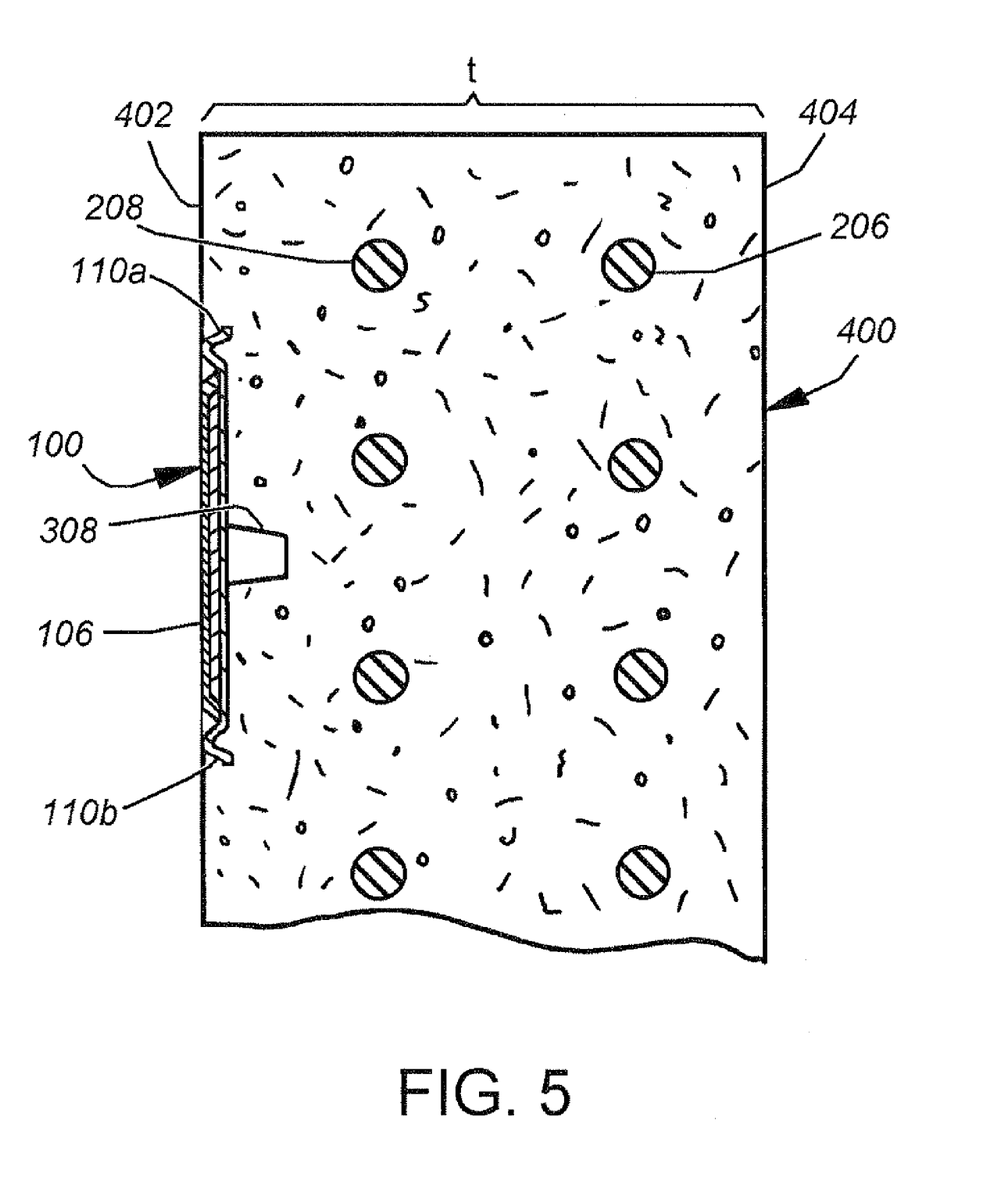
FIG. 5 is a partial cross-sectional view of the precast concrete component and RFID assembly of FIG. 4 along lines 5-5.

FIG. 5 is a cross-sectional view of the concrete component 400 of FIG. 4 along lines 5-5. As shown, the RFID assembly 100 is flush against the outer surface 402 of the concrete component 400. Furthermore, at least some portion of the registration posts 110a, 110b have been broken off. The gripping or engagement surface 308, moreover, extends into the concrete component 400, thereby helping affix the RFID assembly 100 to the concrete component 400.

As shown, the RFID assembly 100 of the present invention is preferably placed on the outside surface of the concrete component 400, which in the illustrative embodiment is a manhole riser. As described above, the manhole riser is typically lowered into a ditch, connected to one or more pipes, and buried along with the pipes. Thus, the outside surface of the manhole riser cover comes into contact with the dirt, rocks and other material used to bury the manhole riser. To protect the RFID tag 100 while the manhole riser is being buried in the ground, the cover 106 of the RFID assembly 100 is preferably formed from an impact-resistant plastic or other similar material. Furthermore, by having the RFID assembly 100 located on the outside surface of the manhole riser, it can be easily seen and examined by workers both at the manufacturing facility, and at the staging area before it is lowered into the ground at its intended location.

Nonetheless, it should be understood that the RFID assembly 100 of the present invention may be positioned at other locations relative to the mold 200. For example, the RFID assembly 100 may be placed inside the mold 200 and surrounded by concrete, so that the RFID assembly 100 is not visible from outside the concrete component. The RFID assembly 100 alternatively may be positioned flush to the outside surface of the inner jacket 202 of the mold 200 so that the RFID assembly 100 is visible on the inner surface 404 of the concrete component 400, as opposed to its outer surface 402.

Figure 6:
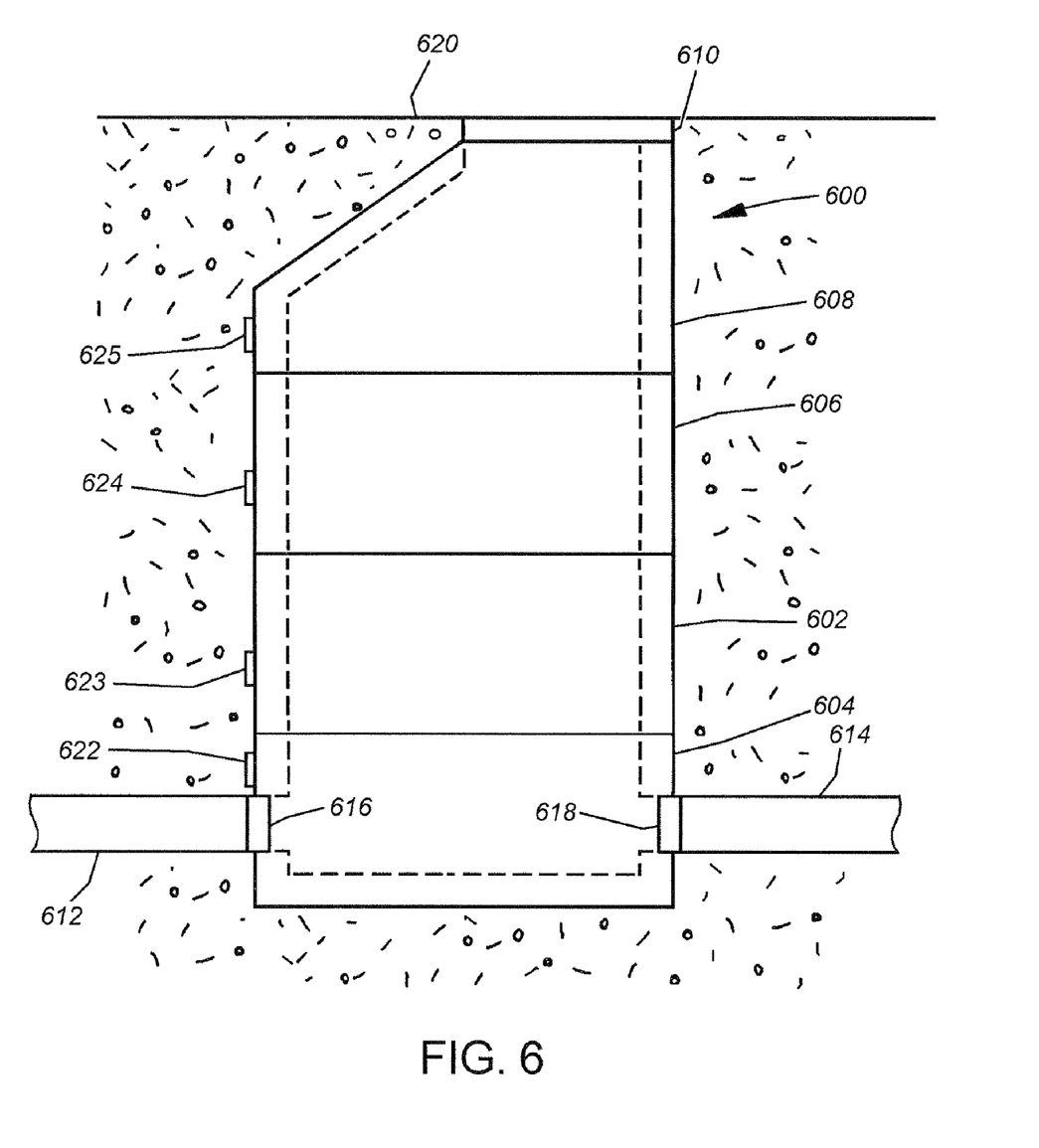
FIG. 6 is a highly schematic side elevation view of a manhole structure assembly.

FIG. 6 is a highly schematic, side elevation of a manhole structure assembly 600, which may be used in a wastewater or storm water system. The manhole structure assembly 600 is made up of a series of precast concrete components, each having a generally cylindrical shape, that are stacked on top of each other. Specifically, the manhole structure assembly 600 includes a manhole base 602, a first riser 604 stacked on top of the manhole base 602, a second riser 606 stacked on top of the first riser 604, and an eccentric cone 608 stacked on top of the second riser 606. Mounted on top of the eccentric cone 608 is a manhole cover 610. Grade rings (not shown) and a manhole frame (not shown) may be positioned between the cone 608 and the manhole cover 610. A series of pipes, such as pipes 612 and 614 are coupled to the manhole base 602 by rubber boots, such as boots 616 and 618. As indicated above, the manhole structure assembly 600 is buried in the ground so that the manhole 610 is flush with a road surface 620. The interior of the manhole structure assembly 600 is hollow so that a worker may descend into the manhole structure assembly 600 to conduct inspections and/or repairs.

In accordance with a preferred embodiment of the present invention, an RFID assembly is cast into each of the concrete components of the manhole structure assembly 600. Specifically, RFID assemblies 622-625, which correspond to RFID assembly 100 described above, are cast into components 602-608, respectively. Each RFID assembly 622-625 has its own unique serial number stored on its RFID tag.

Figure 7:
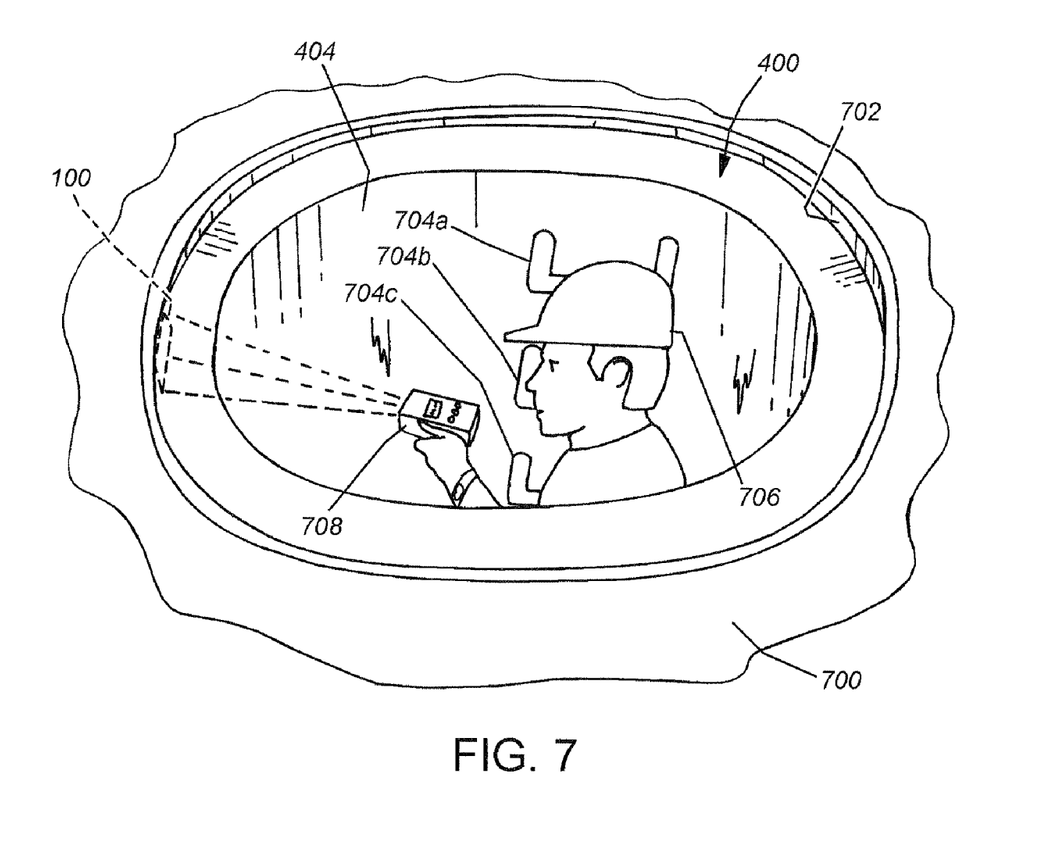
FIG. 7 is an illustration of a maintenance worker reading the RFID assembly of FIG. 1 in an installation.

FIG. 7 is a highly schematic, partial illustration of the concrete component 400 installed at its intended location. Specifically, as indicated above, the concrete component 400 may be the cone portion of a manhole structure assembly that is buried in the ground 700, e.g., below a street. The concrete component 400 may have an upper surface 704 sized and shaped to receive a manhole cover (not shown). Within the concrete component 400 may be a series of steps 704*a-c* so that a worker 706 may climb down into the concrete component 400. The worker 706 may carry an RFID reader 708, and use it to scan the RFID assembly 100 that was cast into the concrete component 400 as described herein. Even though the RFID assembly 100 is located on the outside surface of the concrete component 400, the RFID reader 708 is able to get a reading of the RFID tag 104 housed within the RFID assembly 100 through the concrete and reinforcement element of the concrete component 400. In particular, the reader 708 preferably emits a low-power radio signal that powers up the RFID tag 104. The RFID tag 104 then transmits the information stored in its memory through its antenna. This information is captured and stored by the reader 708.

To help the worker locate the RFID tag 104 from inside the concrete component 400, a mark may be placed on the inside surface of the concrete component 400 indicating where, on the outside surface of the concrete component 400, the RFID tag 104 is located. For example, the RFID tag 104 may be placed at a location on the outer jacket 204 of the mold that is aligned with a weld line along the inner jacket 202 of the mold 200. When the concrete component 400 is cast, this weld line produces a visible line down the inside surface of the concrete component 400. The worker may locate this visible line and activate the reader 708 at this location. Alternatively, the worker may "walk" the reader 708 around the circumference of the of the concrete component 400 until the reader 708 detects the RFID tag 104.

For RFID assemblies that have been installed on concrete components or castings that are too narrow for a worker to enter, such as a concrete pipe, a reader at the end of a long wand, or a device for carrying the reader into such narrow places may be used.

Figure 8:
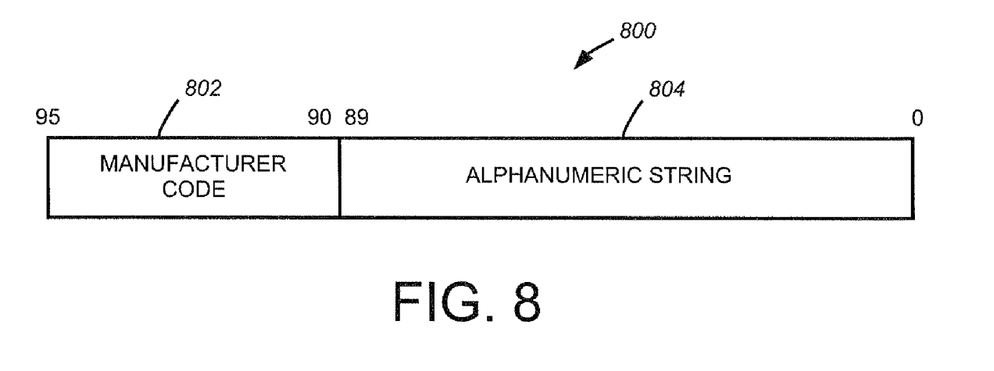
FIG. 8 is a highly schematic illustration of a data structure stored by the preferred RFID assembly.

As described herein, the information stored on the RFID tag 104 is a serial number that uniquely identifies the concrete component 400. FIG. 8 is a highly schematic illustration of a data structure 800 representing the information stored on the non-volatile memory unit of the RFID tag 104. The data structure 800 is organized to store a serial number. In the preferred embodiment, the serial number has a manufacturer code portion 802 and an alphabetic, numeric or alphanumeric portion 804, which together form the unique serial number for the respective concrete component. For example, bits 90-95 of a 96-bit data structure may store the manufacturer code, and bits 0-89 may store the alphanumeric portion. In a preferred embodiment, each concrete component manufacturing making using an RFID assembly 100 of the present invention is assigned its own manufacturer's code. This manufacturer's code, moreover, is used in all RFID assemblies sent to and used by this particular manufacturer.

In the preferred embodiment, the serial number stored on, e.g., written to, the RFID tag 104 cannot be modified or changed.

As described herein, the serial number of an RFID assembly 100 may be associated with the concrete component during the construction of the concrete component. For example, after a particular RFID assembly 100 has been selected and attached to a mold 200, a worker preferably scans the RFID assembly 100, thereby reading its serial number. The reader transmits, e.g., through a wireless connection, the serial number to a data server, which stores the serial number in a database. Additional information is then entered into the database, e.g., through the RFID reader or some other input device, such as a keyboard or mouse, and associated with serial number. This additional information may include the date the concrete component is cast, the batch of concrete used to make the concrete component, the project for which the concrete component is to be used, the particular manhole structure assembly, or other structure, to which the concrete component belongs, the results of the pre- and post-pour inspection, etc.

Those skilled in the art will understand that the data structure 800 may be modified to carry additional information. For example, it may be configured to carry a name or identifier of manufacturer of the concrete component, a name or identifier of the entity that supplied the concrete used to make the component, an identifier of the concrete batch used to make the concrete component, a name or identifier of the entity that supplied the reinforcement element, if any, used in the precast concrete component, a name of the project or structure for which the concrete component is to be used, etc.

Those skilled in the art will understand that the RFID assembly of the present invention can be used with other concrete components besides the elements of a manhole structure assembly. For example, the RFID assembly may be used with concrete septic tanks, concrete box culverts, concrete steps, concrete light and/or utility poles, and concrete components used in the construction of parking garages, such as double tees, slabs and columns, among other concrete components. The RFID assembly of the present invention could also be used in "cast in place" construction, where the concrete component is formed at the construction site. In each case, the RFID assembly is preferably attached to an outer surface of the concrete component.

As described herein, the RFID assembly of the illustrative embodiment does not receive measurement data from any sensors, nor does it perform any data processing functions. Accordingly, the RFID assembly need not include a microprocessor or a power source. It also does not include any communication wires extending from it. As a result, the RFID assembly is economical to manufacture. Furthermore, the RFID assembly only stores a unique identifier for the concrete component to which it is attached. Thus, the memory of the RFID assembly is preferably no more than 512-bits, and more preferably on the order of 96-bits.

The foregoing description has been directed to specific embodiments of this invention. It will be apparent, however, that other variations and modifications may be made to the described embodiments, with the attainment of some or all of their advantages. For example, although the preferred embodiment has been described as using a passive RFID transponder, an active RFID transponder may also be used. Therefore, it is an object of the appended claims to cover all such variations and modifications as come within the true spirit and scope of the invention.

What is claimed is:

1. A cast concrete component configured for in ground installation, the cast concrete component comprising:
 a hollow portion having an outer surface and an inner surface defining a wall thickness between the inner and outer surfaces and an open interior inside of the inner surface;
 a radio frequency identification (RFID) assembly mounted flush along the outer surface of the hollow portion, the RFID assembly including (i) a RFID tag having a memory configured with data uniquely identifying the cast concrete component, and an antenna coupled to the memory, and (ii) a housing that encapsulates the RFID tag, the housing having one or more gripping surfaces extending into the cast concrete component that keep the RFID assembly secured to the concrete component during the in ground installation; and
 one or more reinforcing elements disposed between the inner and outer surfaces,
 wherein
 the RFID tag of the RFID assembly is configured to be readable from the open interior of the hollow portion through the wall thickness.

2. The cast concrete component of claim 1 wherein the memory is a read only memory.

3. The cast concrete component of claim 1 wherein the identifying data includes a serial number a portion of which identifies a manufacturer of the cast concrete component.

4. The cast concrete component of claim 1 wherein the housing of the RFID assembly further includes a back plate and a cover, and the RFID tag is encapsulated between the back plate and the cover.

5. The cast concrete component of claim 1 wherein
 the RFID assembly further includes
  human-readable information disposed within the housing, and visible through at least a portion of the housing.

6. The cast concrete component of claim 5 wherein the human-readable information includes at least one of:
 a name of an entity that manufactured the cast concrete component, and
 a telephone number of the entity that manufactured the cast concrete component.

7. The cast concrete component of claim 1 further comprising:
 a label attached to the RFID housing, the label bearing:
  human-readable information identifying at least a manufacturer of the cast concrete component, and
  a bar code associated with information concerning the cast concrete component.

8. A method for casting a concrete component having built-in identifying information, the method comprising:
 setting up a mold for casting the concrete component, the mold defining an inner surface, an outer surface, a wall thickness between the inner and outer surfaces, and a hollow interior inside of the inner surface;
 placing one or more reinforcement elements in the mold;
 suspending a radio frequency identification (RFID) assembly from the one or more reinforcing elements pending an inspection of the mold;
 releasably attaching the RFID assembly to the mold at a predetermined location on the outer surface following the inspection, the RFID assembly having (i) a RFID tag with a memory configured with data uniquely identifying the concrete component and an antenna coupled to the memory, (ii) human-readable information, and (iii) a housing that encapsulates the RFID tag and has one or more gripping surfaces for extending into the concrete component;
 adding wet concrete to the mold between the inner and outer surfaces so that the concrete envelopes at least part of the RFID assembly, said concrete, when dry, forming the concrete component; and
 removing the concrete component from the mold, leaving the RFID assembly secured to the concrete component, wherein
  the RFID tag of the RFID assembly is configured to be readable from the hollow interior of the cast concrete component.

9. The method of claim 8 wherein the RFID assembly further includes one or more registration posts extending from the RFID assembly, and the mold includes a corresponding receiving hole for each of the one or more registration posts of the RFID assembly, the attaching further comprising:
 inserting each of the one or more registration posts of the RFID assembly into the corresponding receiving hole of the mold.

10. The method of claim 9 wherein the RFID assembly defines a nominal plane and the one or more registration posts extend from the nominal plane of the RFID assembly.

11. The method of claim 10 wherein the removing further comprises:
 breaking away a portion of each of the one or registration posts.

12. A radio frequency identification (RFID) assembly for attachment along a surface of a cast concrete component, the RFID assembly comprising:
 a back plate having a front, and a back;
 a cover attached to the front of the back plate;
 an RFID tag disposed between the cover and the back plate, the RFID tag including a memory configured with data uniquely identifying the cast concrete component, and an antenna coupled to the memory;
 a label bearing human-readable information concerning the cast concrete component;
 at least one gripping surface extending from the back of the back plate, and configured to be received into the cast concrete component; and
 a hook wherein the hook is sized for grasping a reinforcement element.

13. The RFID assembly of claim 12 comprising at least one registration post.

14. The RFID assembly of claim 12 composing at least one registration hole.

15. The RFID assembly of claim 12 wherein
 the label is disposed between the back plate and the cover,
 at least a portion of the cover is transparent, and
 the human-readable information is visible through the transparent portion of the cover.

16. The RFID assembly of claim 12 wherein the cover and the back plate form a watertight seal around the RFID tag.

* * * * *